(12) United States Patent
Pedrini (10) Patent No.: US 9,315,142 B1
(45) Date of Patent: Apr. 19, 2016

(54) STRAP CUSHION FOR AN EQUIPMENT SUPPORT

(71) Applicant: Fabio Pedrini, Bologna (IT)

(72) Inventor: Fabio Pedrini, Bologna (IT)

( * ) Notice: Subject to any disclaimer, the term of this patent is extended or adjusted under 35 U.S.C. 154(b) by 0 days.

(21) Appl. No.: 14/270,775

(22) Filed: May 6, 2014

Related U.S. Application Data (60) Provisional application No. 61/820,418, filed on May 7, 2013.

(51) Int. Cl.
*B65D 63/10* (2006.01)
*B60P 7/06* (2006.01)

(52) U.S. Cl.
CPC . *B60P 7/06* (2013.01); *B65D 63/10* (2013.01); *Y10T 24/1498* (2015.01)

(58) Field of Classification Search
CPC .............. B60P 7/06; F16L 3/233; A45F 3/12; Y10T 24/1498; Y10T 24/141; B65D 63/10; B65D 63/1027; B65D 63/109; B65D 67/00; B65D 67/02
USPC ................... 24/16 PB, 68 AS, 71.1; 224/264; 132/223, 248, 236, 275, 276
See application file for complete search history.

(56) References Cited

U.S. PATENT DOCUMENTS

| | | | |
|---|---|---|---|
| 5,038,980 A | 8/1991 | Baldeck | |
| 5,118,018 A | 6/1992 | Baldeck | |
| 5,129,559 A | 7/1992 | Holliday | |
| 5,215,233 A | 6/1993 | Baldeck | |
| 5,250,345 A * | 10/1993 | Chu | ............................... 428/156 |
| 5,259,542 A | 11/1993 | Newbold et al. | |
| 5,507,422 A * | 4/1996 | Shields | ........................... 224/264 |
| 5,593,076 A | 1/1997 | Biondo | |
| 5,647,521 A | 7/1997 | Burgess | |
| 5,775,555 A | 7/1998 | Bloemer et al. | |
| 6,220,492 B1 * | 4/2001 | Huang | ........................... 224/264 |
| 6,279,795 B1 * | 8/2001 | Pierzina | ......................... 224/150 |
| 7,448,522 B2 * | 11/2008 | Collier et al. | .................. 224/264 |
| 7,757,917 B2 | 7/2010 | Bogoslofski et al. | |
| 7,810,685 B2 | 10/2010 | Bove et al. | |
| 7,992,749 B2 * | 8/2011 | Fidrych et al. | ................. 224/264 |
| 8,220,678 B2 | 7/2012 | Bove et al. | |

* cited by examiner

*Primary Examiner* — Abigail Morrell
(74) *Attorney, Agent, or Firm* — Boyle Fredrickson, S.C.

(57) ABSTRACT

A cushioning arrangement for a strap for an equipment retainer, such as for use with a vehicle-mounted bicycle rack or the like, includes a cushion member selectively receivable over the strap. The cushion member defines a cushioned inner surface that prevents damage to the item of equipment when the strap is engaged about the item of equipment. The cushion member includes a series of segments that are coupled to one another and are selectively expandable in an axial direction along a length of the strap, to provide an expandable and contractable adjustable length feature. The series of segments may each include a spacer member extending across a width of the strap, a bridge member coupled to opposing ends of the spacer member; and expandable and contractable connectors between adjacent segments to couple the segments in a selectively expandable and contractable manner.

6 Claims, 9 Drawing Sheets

STRAP CUSHION FOR AN EQUIPMENT SUPPORT

PRIORITY CLAIM

This patent application claims the benefit of U.S. provisional patent application Ser. No. 61/820,418 filed May 7, 2013, the entire contents and disclosure of which are hereby expressly incorporated by reference.

BACKGROUND AND SUMMARY

This invention relates to an equipment support, such as a vehicle-mounted equipment carrier, and more particularly to a strap cushion for an equipment support configured to protect an item of equipment when it is secured to the support.

A vehicle-mounted equipment carrier, such as a bicycle rack configured for mounting to the rear of a vehicle, typically includes a support structure adapted to be secured to the vehicle and an equipment engagement arrangement for securing an item of equipment, such as a bicycle, to the support structure. In the case of a hatch-mounted or trunk-mounted rack, the support structure typically includes a frame arrangement that is may rest on the bumper and surface of the hatch or trunk, and that is secured to the vehicle via straps having hooks that are engaged with the edges of the hatch or trunk. An equipment support arrangement, such as a pair of arms or the like, extend rearwardly from the frame. An item of equipment, such as a bicycle, is engaged with the arms in a suspension-type manner. In the ease of a hitch-mounted rack, the support structure typically includes a bar engaged with the trailer hitch of the vehicle and a frame secured to the hitch-mounting bar. Various types of equipment engagement arrangements may be supported by the frame, such as arms that support the equipment in a suspension-type manner or a support arrangement that supports the item of equipment from below. In the case of a bicycle, the support arrangement may be engaged with the bicycle wheels and/or the from below. Equipment carriers, such as bicycle racks, of both types are well known.

In securing the item of equipment to the support structure, it is widely known to provide releasable equipment retainers, which in one form may be a series of straps or the like. Typically, the equipment carrier supports areas of the item of equipment at spaced-apart locations, and a strap is releasably secured about the supported area of the item of equipment to maintain it in position on the carrier. In the case of a bicycle, the retainer straps are typically wrapped about the bicycle frame components, the wheels, the pedal crank arms, etc. The straps must flexible so as to be capable of being wrapped around differently configured areas of the item of equipment, and must also be sufficiently strong to withstand forces experienced during transport. Typically, the straps are formed of a flexible thermoplastic material. Normally, the carrier includes an equipment support area having a saddle-type structure that supports the item of equipment. A strap located adjacent the equipment support area has a free end that extends from the equipment support area and that can be wrapped about the supported area of the item of equipment. The strap is typically releasably engaged with a retainer of some form, such as a buckle, a ratchet-type retainer, etc. In some cases, the strap may have a series of aligned openings, one of which may be engageable with a peg or the like to releasably secure the strap about the supported area of the item of equipment. Straps of this type are typically stretchable, which can be less than desirable in that it presents the potential for the equipment to become dislodged from the equipment support area in the event the equipment carrier is subjected to a violent jolt during use. Many straps, therefore, are constructed of a more rigid yet flexible material that does not stretch but which can be wrapped about the item of equipment to secure it in place. When a strap of this type is wrapped about an item of equipment, it presents the possibility to the underlying surface of the item of equipment may become scratched or marred during movement of the vehicle. In some cases, it has been known to provide a resilient, cushioning surface on the strap during manufacture. While this approach is satisfactory, it increases manufacturing complexity and therefore cost.

It is an object of the present invention to provide a cushion arrangement for an equipment carrier retainer, such as a strap, which can be selectively placed on the carrier retainer when desired and removed when not needed. It is another object of the invention to provide such a cushion arrangement capable of accommodating equipment carrier retainers of different lengths. It is a further object of the invention to provide such a cushion arrangement which is relatively simple in construction and operation, yet which provides a highly satisfactory cushioning feature when used.

In accordance with the present invention, a strap for an equipment retainer includes a first end opposite a second end and an inner surface opposite an outer surface. An engagement arrangement is configured to selectively releasably engage the first end of the strap to secure the strap about an item of equipment. A cushion member is selectively receivable over the strap between the first end and the second end and defines a cushioned inner surface that prevents damage to the item of equipment by the strap when the strap is engaged about the item of equipment. In one form, the cushion member includes a series of segments that are coupled to one another and are selectively expandable in an axial direction along a length of the strap, to provide an expandable and contractable adjustable length feature. The series of segments may each include a spacer member extending across a width of the inner surface; a bridge member extending across a width of an outer surface and coupled to opposing ends of the spacer member; and expandable and contractable connectors between adjacent segments to thereby couple the segments in a selectively expandable and contractable manner.

In accordance with another aspect of the invention, a cushion for a strap includes a series of segments configured to be received over a length of the strap and configured to define an inner surface that prevents damage to a piece of equipment around which the strap is secured. One or more of the series of segments may be in the form of a spacer member that extends across a width of an inner surface of the strap; a bridge member that extends across a width of an outer surface of the strap and couples opposing ends of the spacer member to one another; and at least one expandable member secured to the at least one segment and coupled to an adjacent segment and configured to be selectively expanded and contracted to adjust a length of the cushion. The spacer member, bridge member and at least one expandable member may be integrally formed, and representatively may be constructed of a resilient cushioning material. The spacer member may be formed to define a pair of opposing ends connected to one another across the width of the inner surface by a pair of opposing sides. The bridge member may define a pair of laterally opposed sides connected to one another across the width of the outer surface by a connecting element. The bridge members of the plurality of segments may be arranged to define a tunnel that is configured to receive the strap therethrough for use in coupling the cushion to the strap.

In accordance with another aspect of the invention, a method of cushioning a strap for an equipment support includes the act of selectively inserting an end of the strap into and through a passage defined by a cushion member. The cushion member has an inside cushioning arrangement interposed between the strap and an item of equipment when the strap is tightened onto the item of equipment.

These and other features, objects and advantages of the present invention will be made apparent from the following description taken together with the drawings.

BRIEF DESCRIPTION OF THE DRAWINGS

An exemplary embodiment of the invention is illustrated in the accompanying drawings in which like reference numerals represent like parts throughout.

In the drawings.

In describing the exemplary embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

A specific embodiment of the present invention will be described by the following non-limiting example which will serve to illustrate various features of the invention.

Figure 1:
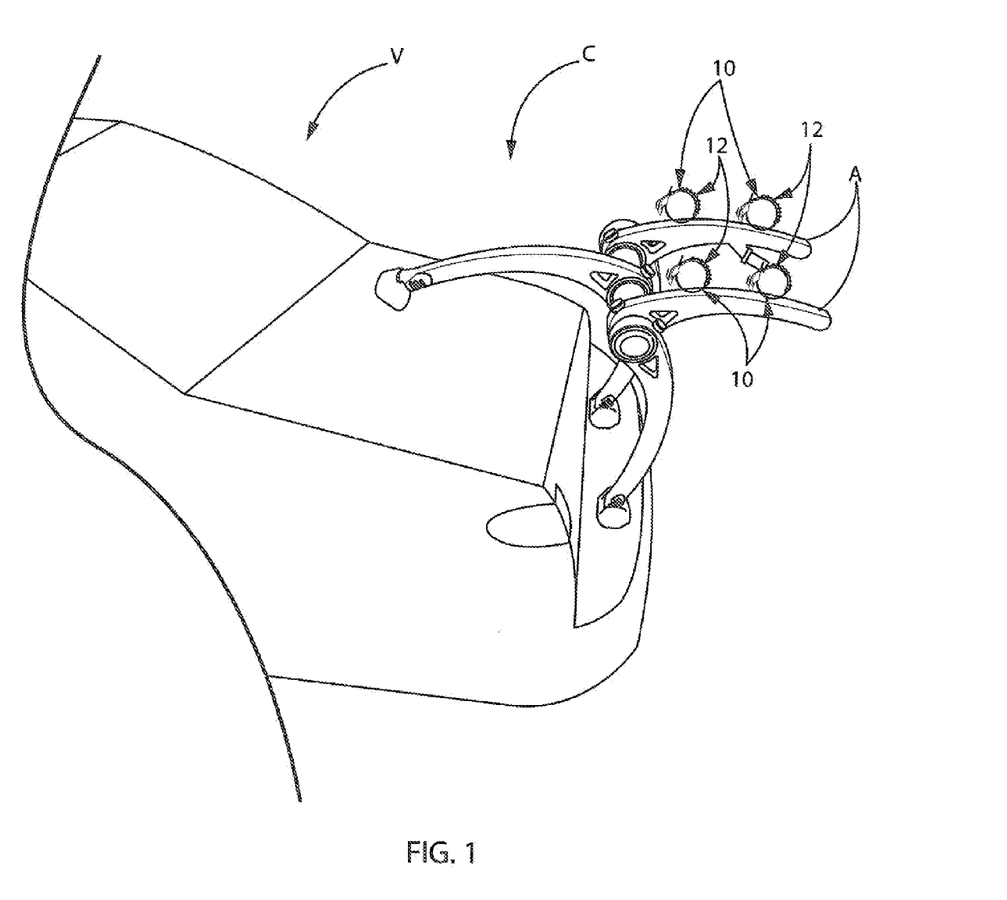
FIG. 1 is an isometric view of a vehicle-mounted equipment carrier, in the form of a bicycle rack, incorporating the strap cushion arrangement of the present invention, with the rack being shown mounted to the trunk of a vehicle.

FIG. 1 illustrates a representative application for the cushioned strap arrangement of the present invention. As shown in FIG. 1, an equipment carrier is illustrated as being mounted to the trunk area of a vehicle V. The illustrated equipment carrier C is in the form of a trunk-mounted bicycle rack commercially available from Saris Cycling Group, Inc. of Madison, Wis. under its designation BONES. In a manner as is known, the equipment carrier C includes a frame structure engaged with the vehicle V at spaced apart locations, such as on the bumper and the top surface of the trunk of the vehicle V. A series of straps (not shown) are used to secure the equipment carrier C to the vehicle V. The equipment carrier C also includes a pair of laterally spaced rearwardly extending equipment-supporting arms A, which are adapted to support items of equipment, such as a pair of bicycles, in a suspension-type manner. Each arm A is provided with a pair or equipment retainers in the form of straps 10, which are secured to the arm A in axially spaced locations in a manner as is known. Also as is known, each strap 10 is configured to be releasably secured about an area of a bicycle supported on the arm A at the location of the strap 10 to secure the bicycle to the equipment carrier C.

It should be understood that the equipment carrier C as illustrated in FIG. 1 is simply representative of any number and type of vehicle-mounted equipment carrier in connection with which the cushioned strap arrangement of the present invention may be employed. For example, and without limitation, other types of equipment carriers in connection with which the cushioned strap arrangement of the present invention may be employed include other types of trunk-mounted or hatch-mounted racks, hitch-mounted racks, roof racks, etc. The type of equipment that can be supported by the carrier is not limited to bicycles and may be any equipment or object capable of being supported by a vehicle-mounted carrier.

Figure 2:
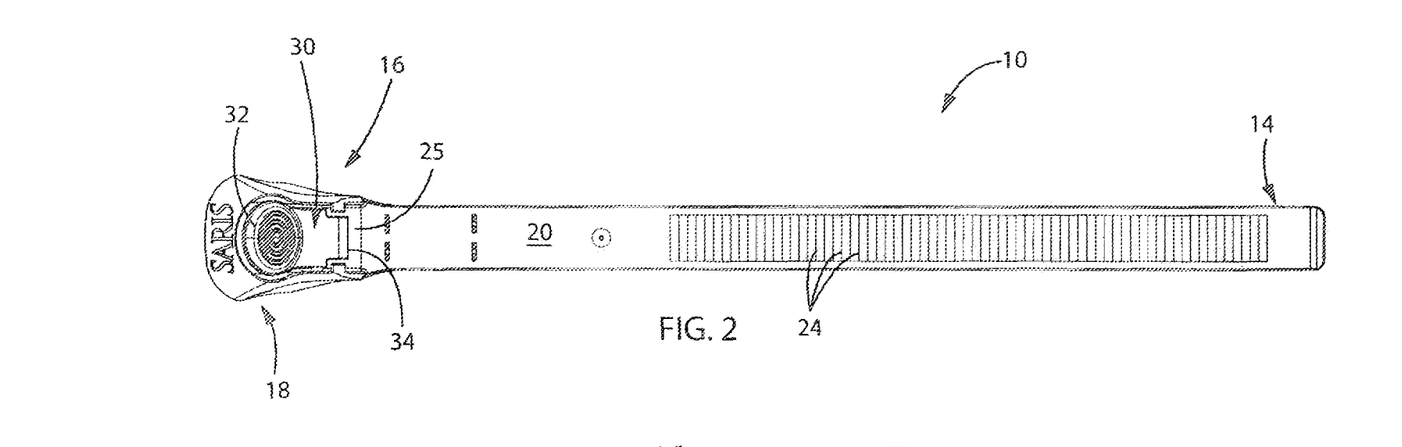
FIG. 2 is a plan view of a retainer strap incorporated in the equipment carrier of FIG. 1.
Figure 3:
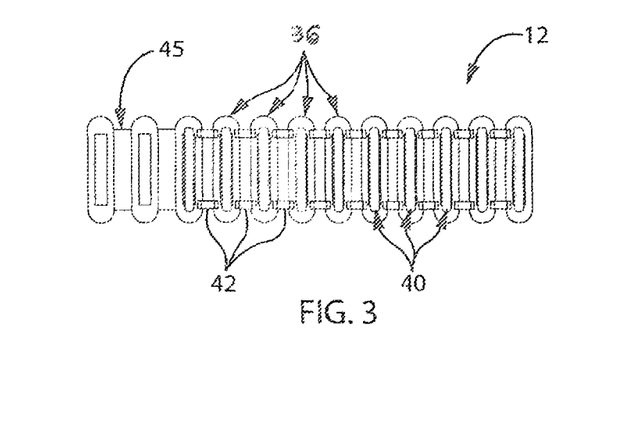
FIG. 3 is a plan view of a strap cushion arrangement in accordance with the present invention for use in combination with the retainer strap of FIG. 2.

FIG. 2 illustrates one of the straps 10 separated from the equipment carrier C, and FIG. 3 illustrates a strap cushion member 12 in accordance with the present invention that is adapted to be used in combination with strap 10 to provide a cushioning feature for items about which the strap 10 is secured.

The strap 10 may be constructed from a relatively flexible material such as plastic or any other suitable material. The cushion member 12 may be constructed from a flexible and relatively soft material such as urethane or the like so that, when the cushion member 12 is positioned on the strap 10 and engages an item of equipment, the cushion member 12 comes between the strap 10 and the item of equipment and the strap 10 does not mar or otherwise damage the equipment.

The strap 10 is generally elongate and extends along a longitudinal axis, and defines a first end 14 opposite a second end 16. The second end 16 includes an engagement mechanism, which may be in the form of a ratchet arrangement 18 configured to selectively receive and engage a series of ratchet teeth 24 that extend inwardly from the first end 14. In this manner, the first end 14 can be coupled to the second end 16 to position the strap 10 in a closed or buckled position as shown in FIGS. 1 and 7-10. It is understood that the ratchet-type engagement mechanism as shown is representative of any number of different engagement arrangements that may be used to releasably secure a strap, such as strap 10, in a closed position around an object or item of equipment.

The strap 10 includes an outer surface 20 and an opposing inner surface 22, which is configured to be cinched against the item of equipment when the strap 10 is in the closed position as will later be described. The teeth 24 extend along a portion of the outer surface 20.

The buckle 18 is of conventional construction, including an opening 25 sized and shaped to receive the first end 14 of the strap 10 and a biased ratchet lever 30 having a release button 32 at one end and a strap engaging portion 34 opposite the release button 32. The lever 30 is pivotally coupled to the buckle 18 to be selectively moved from a strap engaging position when the release button 32 is not actuated to a strap disengaging position when the release button 32 is depressed. As is known, the first end 14 of the strap 10 is looped around the item of equipment and inserted through the opening 25. The user then pulls the first end 14 of the strap through the opening 25 such that the teeth 24 are moved past the strap engaging portion 34 of the lever 30. The strap engaging portion 34 of the lever 30 engages the teeth 24 in a ratcheting manner, so that the first end 14 of the strap 10 is securely coupled with the buckle 18 around the item of equipment. The first end 14 may be pulled through the opening 25 until a desired level of tightness is applied on the item of equipment by the strap 10 to ensure that the item of equipment is sufficiently secured. To release the strap 10 from the item of equipment, the user depresses the release button 32 to pivot the strap engaging portion 34 away from the teeth 24 of the strap 10 such that the first end 14 of the strap may be pulled through the opening in the opposite direction and released from the buckle 18.

Understandably, any number of alternative buckling or engagement arrangements may be utilized in place of the ratchet-type arrangement as shown and described.

Figure 4:
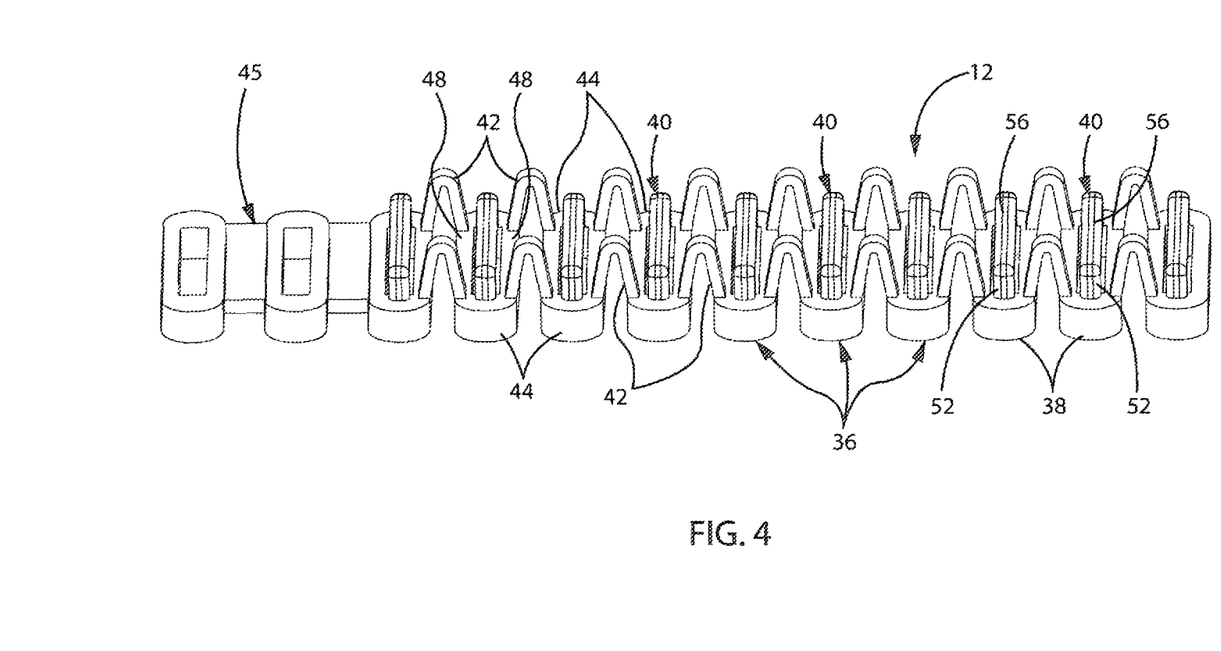
FIG. 4 is an isometric view of the strap cushion arrangement of FIG. 3.
Figure 5:
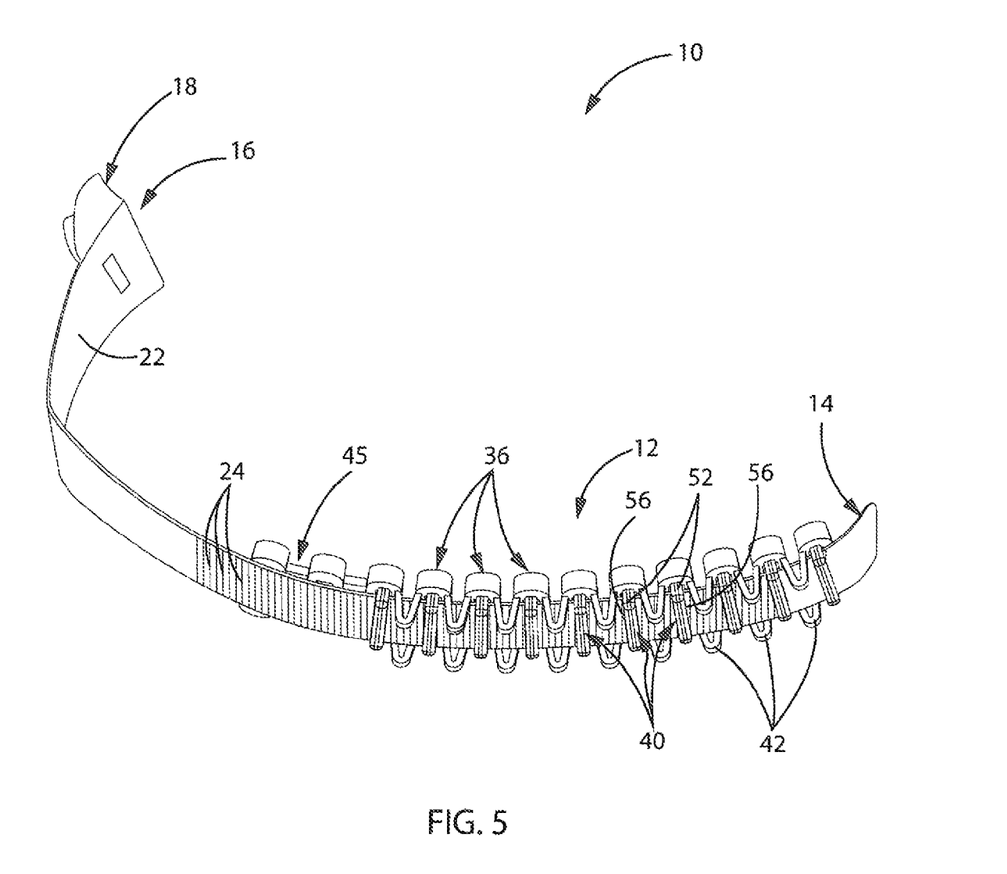
FIG. 5 is an outer side isometric view illustrating the strap cushion arrangement of FIG. 3 engaged with the retainer strap of FIG. 2, with the retainer strap in an open position.

Referring to FIGS. 3 and 4, the cushion member 12 includes a number of spaced segments 36 that are configured to extend across the width of the strap 10. Each segment 36 includes a spacer member 38 configured to engage the item of equipment during use and which is configured to be positioned over a width of the inner surface 22 of the strap 10. Each segment 36 further includes a bridge member 40 that extends from one side of the spacer member 38 across to the other side of the spacer member 38. The bridge members 40 cooperate with the spacer members 38 to define an axially extending segmented tunnel, which is adapted to receive the first end 14 of the strap 10. In this manner, the first end 14 of the strap 10 can be inserted into the tunnel defined by the bridge members 40 such that the cushion member 12 is slid onto the strap 10, as shown in FIG. 5, to releasably couple the cushion member 12 to the strap 10.

Figure 6:
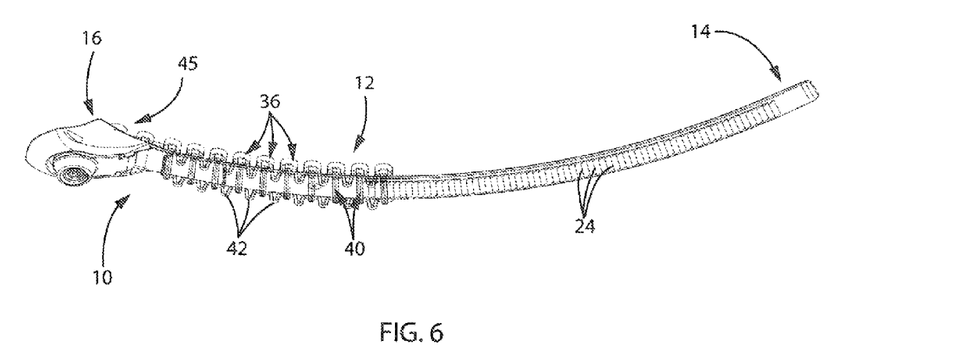
FIG. 6 is an isometric view similar to FIG. 5, showing the strap cushion arrangement of FIG. 3 slid fully onto the retainer strap of FIG. 2.
Figure 7:
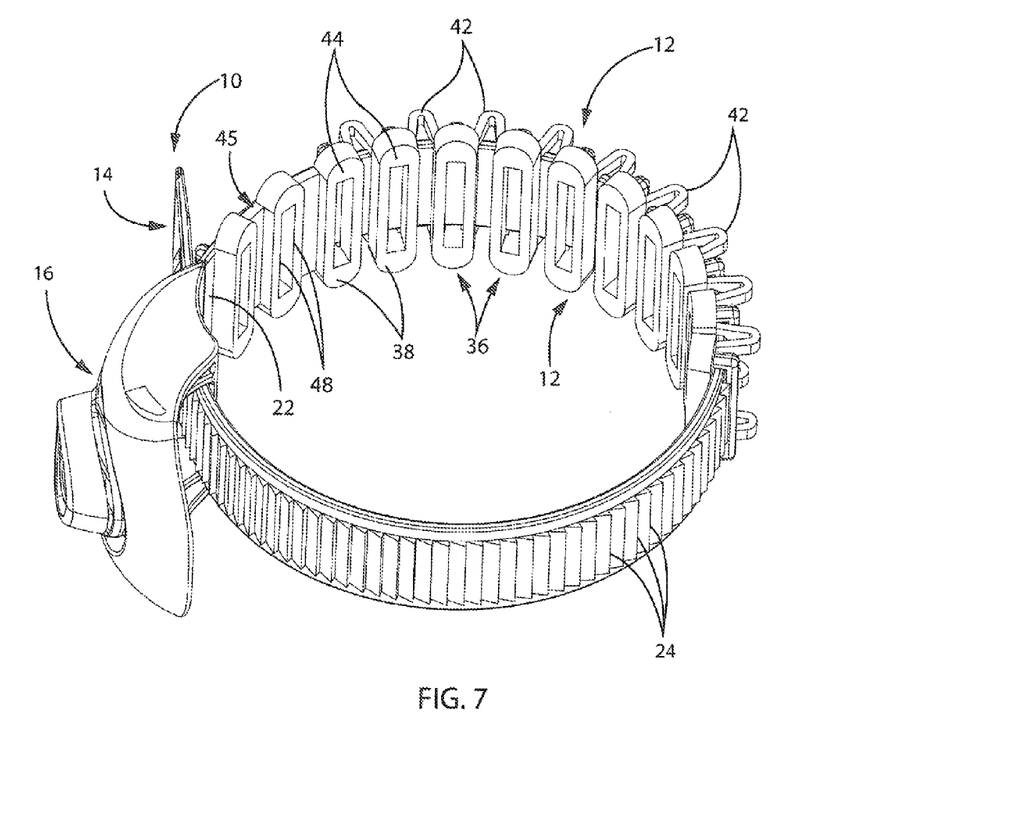
FIG. 7 is an inner side isometric view of the retainer strap of FIG. 2 and the strap cushion arrangement of FIG. 3, with the retainer strap in an engaged position.
Figure 8:
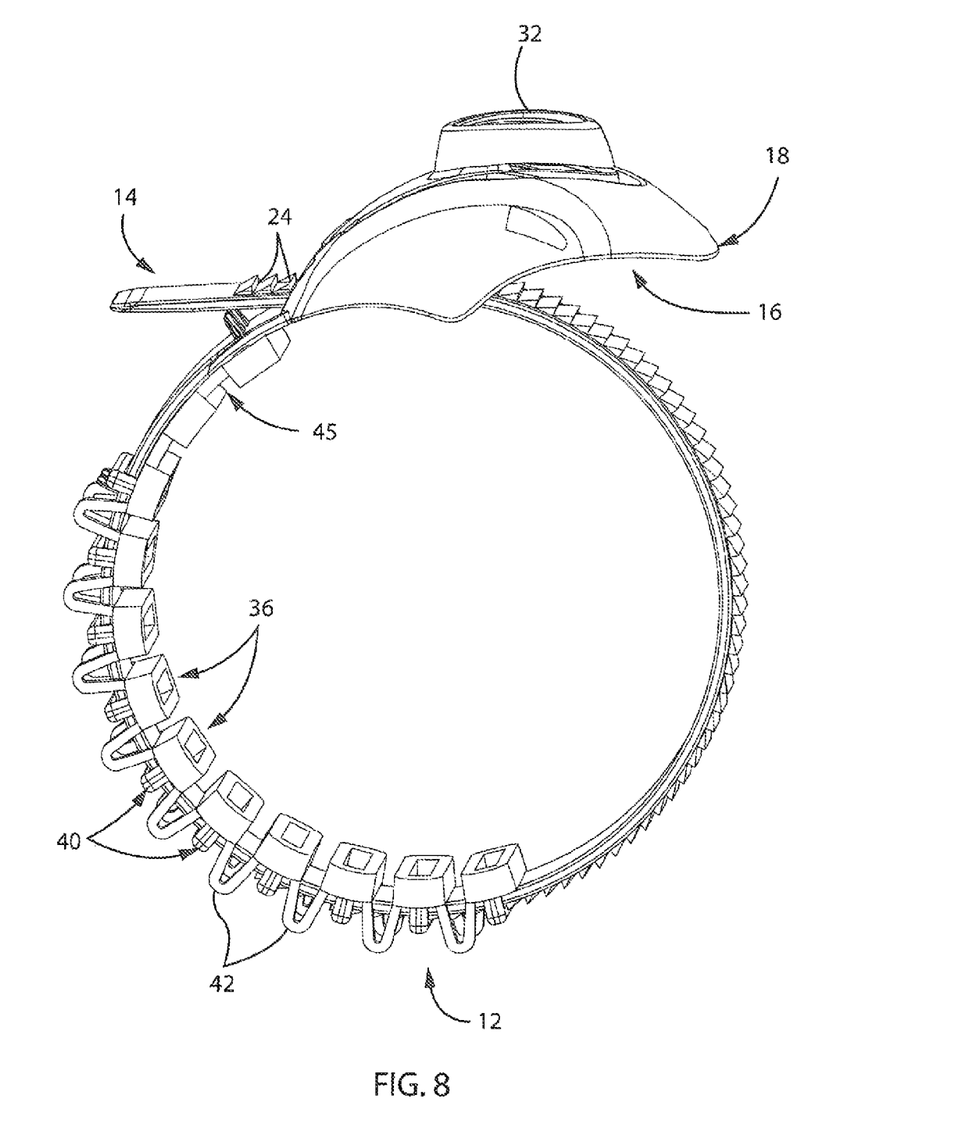
FIG. 8-10 are additional isometric views showing the retainer strap of FIG. 2 and the cushion arrangement of FIG. 3, with the retainer strap in the closed position, and showing engagement of the cushion arrangement with the retainer strap.
Figure 9:
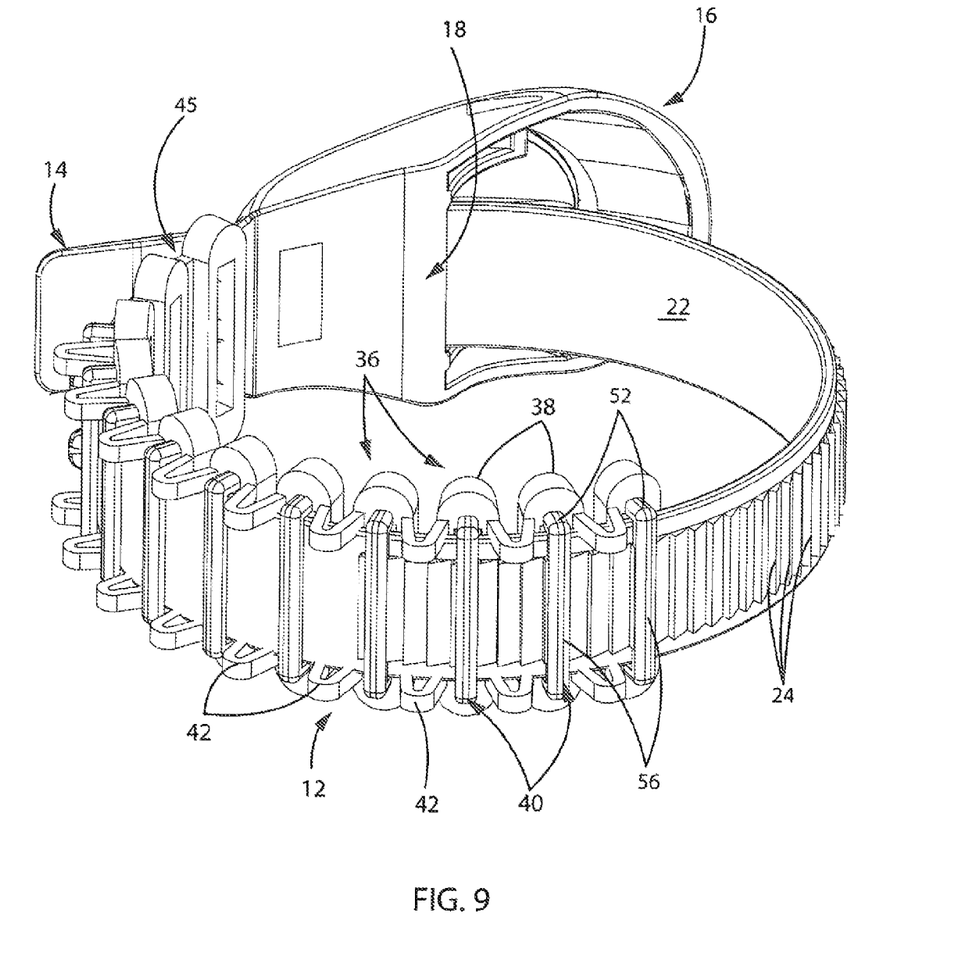
Figure 10:
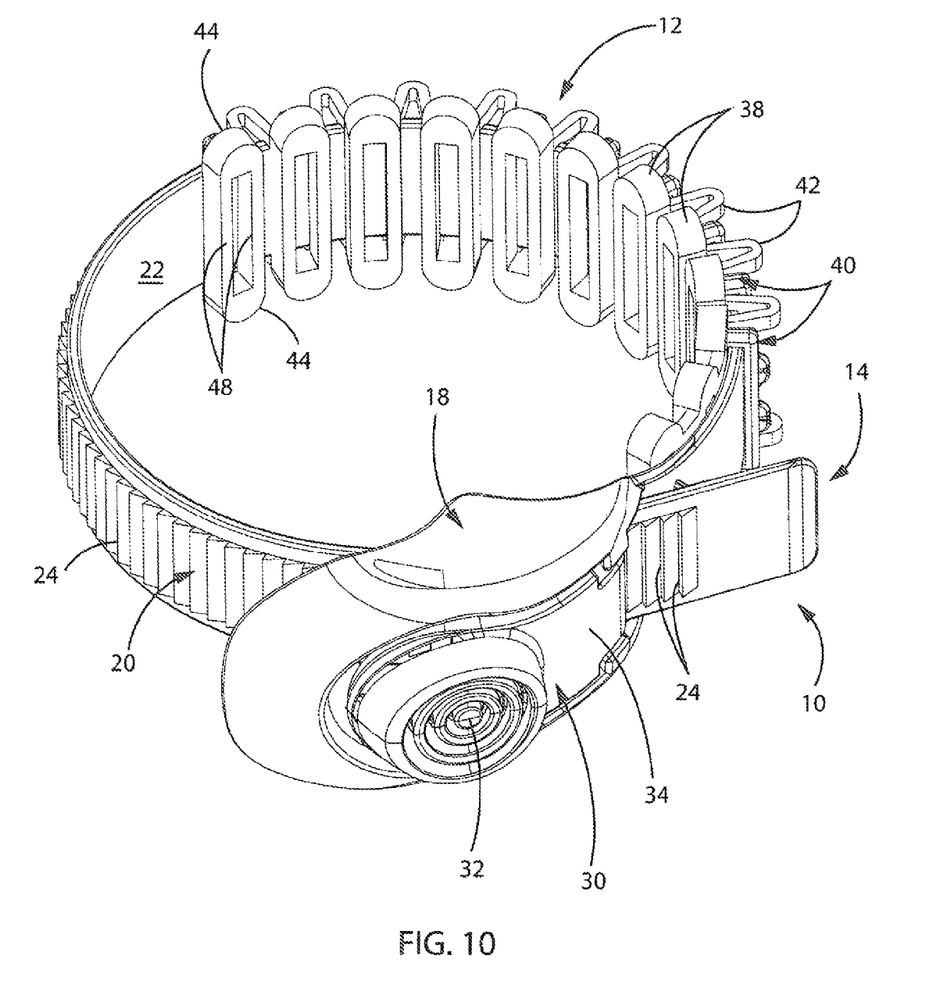

Each segment 36 is coupled to an adjacent segment 36 by a pair of selectively expandable V-shaped connector sections 42, which enables the cushion member 12 to be stretched or compressed along the strap 10 to accommodate straps and equipment of various configurations. The cushion member 12 may further include a number of segments in which the bridge member 40 is absent and in which there are no connector sections 42 between the segments 36, such as at an end area of the cushion member 12 shown at 45, as may be desired. The end area 45 may be used as a finger grip to facilitate handling of cushion member 12, and may be positioned to underlie buckle 18 when cushion member 12 is engaged with strap 10, as shown in FIG. 6.

As illustrated, the spacer members 38 may be generally oval-shaped and each includes a pair of rounded, opposed end sections 44 joined by spaced apart side sections 48. The end sections 44 and side sections 48 are configured to engage the equipment when the strap 10 is tightened onto the equipment. The spacer members 38 may be configured to define an opening between the respective end sections 44 and side sections 48, which provides a degree of flexibility to each spacer member 38 that enables it to adapt and conform to the surface of the item of equipment against which the cushion member 12 is engaged. It is understood, however, that the spacer members 38 may be solid or have any other satisfactory configuration so long as the spacer members 38 are capable of engaging the equipment in a non-damaging manner.

The bridge members 40 may be integrally molded with the spacer members 38, as is shown in the figures, or alternatively, the bridge members 40 may be formed separately and coupled to the spacer members 38 via any conventional method. The bridge members 40 include spaced apart side elements, which extend from a rear side of the spacer members 38 and which are connected to one another across the width of the strap 10 by an elongate connector section 56. The side elements 52 and elongate connector section 56 serve to define a space above the spacer member 38, as noted above, through which the strap 10 may be received to thereby secure the cushion member 12 to the strap 10.

The connector sections 42 are configured to couple adjacent segments 36 to one another in a flexible, accordion-like manner such that the spacing between adjacent segments 36 may be adjusted. This can be accomplished by pulling one end of the cushion member 12 away from its opposing end to thereby stretch or elongate the cushion member 12. Conversely, the cushion member 12 can be compressed by pushing the ends of the cushion member 12 together. The connector sections 42 may be integrally formed with the adjacent spacer members 38 or otherwise secured between the spacer members 38. The connector sections 42 may be configured to initially be positioned in a contracted orientation in which the space between the adjacent spacer members 38 is relatively minimal. As desired, the connector sections 42 may be stretched from the initial position to provide a space between the adjacent spacer members 38. When expanded, the connector sections 42 may be generally V-shaped. The connector sections 42 may be constructed from the same or similar material as the rest of the cushion member 12 or some other similarly suitable material as may be desired.

To prevent the connector sections 42 from contracting to the initial, unexpanded positions, the bridge members 40 of the segments 36 may be engaged with the teeth 24 of the strap 10 to thereby maintain the cushion member 12 in a desired position. The cushion member 12 may be slid along the entire length of the strap 10 between the end of the buckle 18 nearest the first end 14 and the second end 16 of the strap 10. In this manner, the cushion member 12 is able to accommodate equipment of varying sizes, shapes, and constructions while securely holding the equipment relative to the vehicle-mounted equipment carrier.

The cushion member 12 is moved to a relatively expanded condition by application of an axial stretching force to one of its ends, to accommodate a relatively larger item of equipment. Conversely, the cushion member 12 can be compressed into a smaller length in order to secure a relatively smaller item of equipment, which can be accomplished when the strap 10 is tightened onto the item of equipment.

As indicated previously, the cushion member 12 may be constructed from a relatively pliable and soft plastic or similarly suitable material in order to provide the desired stretch, cushioning, pliability and resilience features. It is understood that, as desired, the spacer members 38, bridge members 40, and connector sections 42 may be constructed from the same or similar material or, alternatively, may be constructed from differing material so long as the resulting cushion member 12 is capable of carrying out the objects of the invention. In particular, the spacer member 38 may be configured to be soft and impact resistant so as to not mar or otherwise damage the equipment.

It is understood that the expansion and contraction features of the cushion member 12 are not essential to operation. That is, the segmented construction of the cushion member 12 may be replaced with one or more solid, fixed-length cushions or cushion sections if desired, which would provide cushioning protection along all or a portion of the strap length.

Although the best mode of carrying out the present invention is disclosed above, practice of the present invention is not limited thereto. It is further contemplated that various additions, modifications and rearrangements of the features of the present invention may be made without deviating from the spirit and scope of the invention as set forth in the following claims.

I claim:

1. A strap arrangement for an equipment support, the strap arrangement comprising:
    a strap having a first end opposite a second end and an inner surface opposite an outer surface;
    an engagement arrangement provided at the second end and configured to selectively releasably engage the first end to secure the strap around an item of equipment; and
    a cushion member selectively engageable with the strap between the first end and the second end and configured to provide an inwardly facing cushioning surface that engages the item of equipment secured by the strap to the equipment support, wherein the cushion member comprises a plurality of segments coupled to one another and selectively expandable along a length of the strap, and wherein at least first and second ones of the plurality of segments each comprise a spacer member extending across a width of the inner surface of the strap and a bridge member extending across a width of the outer surface of the strap and coupled to opposing ends of the spacer member, wherein an open area is defined between a bottom surface of the bridge member and a top surface of the spacer member, and wherein the open area of the first segment and the open area of the second segment are in alignment with each other and define a segmented tunnel for receiving the strap; and
    wherein one or more expandable and contractible connectors extend between and connect together the first and second segments, wherein the expandable and contractible connectors couple the first and second segments in a selectively expandable and contractible manner, wherein contraction of the connectors selectively enables the first and second segments to be positioned relatively closer together along the length of the strap and expansion of the connectors selectively enables the first and second segments to be positioned relatively farther apart along the length of the strap, wherein contraction and expansion of the connectors moves the open areas of the segments along the strap to vary the overall length of the cushion member relative to the length of the strap.

2. The strap arrangement of claim 1, wherein the expandable and contractible connectors comprise a pair of laterally spaced flexible V-shaped connectors that interconnect the first and second segments.

3. The strap arrangement of claim 1, wherein the spacer members, bridge members and expandable and contractible connectors are integrally formed.

4. The strap arrangement of claim 3, wherein the spacer members, bridge members, and expandable and contractible connectors are constructed from a resilient cushioning material.

5. The strap arrangement of claim 3, wherein the opposing ends of each spacer member are connected to one another across the width of the spacer member by a pair of opposing sides, the opposing ends and the opposing sides defining an open area of the spacer member.

6. The strap arrangement of claim 3, wherein each bridge member comprises a pair of laterally opposed sides connected to one another across the width of the bridge member by a connecting element.

* * * * *